United States Patent
Karches et al.

(10) Patent No.: US 10,703,630 B2
(45) Date of Patent: Jul. 7, 2020

(54) PROCESS FOR PREPARING CHLORINE FROM HCl

(75) Inventors: Martin Karches, Neustadt (DE); Kati Bachmann, Viernheim (DE); Martin Sesing, Waldsee (DE); Lothar Seidemann, Brussels (BE); Knud Jacobsen, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1878 days.

(21) Appl. No.: 13/378,082

(22) PCT Filed: Jun. 17, 2010

(86) PCT No.: PCT/EP2010/058523
§ 371 (c)(1),
(2), (4) Date: Dec. 14, 2011

(87) PCT Pub. No.: WO2010/149560
PCT Pub. Date: Dec. 29, 2010

(65) Prior Publication Data
US 2012/0093711 A1    Apr. 19, 2012

(30) Foreign Application Priority Data
Jun. 24, 2009   (EP) ..................... 09163609

(51) Int. Cl.
*C01B 7/04*    (2006.01)

(52) U.S. Cl.
CPC ..................... *C01B 7/04* (2013.01)

(58) Field of Classification Search
CPC ....................................................... C01B 7/04
(Continued)

(56) References Cited

U.S. PATENT DOCUMENTS 3,760,067 A * 9/1973 Ingwalson ........... B01J 27/1817
423/502
4,774,070 A * 9/1988 Itoh et al. ..................... 423/502
(Continued)

FOREIGN PATENT DOCUMENTS

DE    10 2004 01467    10/2005
WO    2005 077520    8/2005
(Continued)

OTHER PUBLICATIONS

H. Scott Fogler, "Elements of Chemical Reaction Engineering", Fourth Edition, 2006, Chapter 10 "Catalyst Decay", pp. 1-30, taken from http://www.umich.edu/~essen/html/byconcept/cdchap/10chap/ECRE_CD-CH10.pdf.*

(Continued)

*Primary Examiner* — Ngoc-Yen Nguyen
(74) *Attorney, Agent, or Firm* — Oblon, McClelland, Maier & Neustadt, L.L.P.

(57) ABSTRACT

Process for preparing chlorine by oxidation of hydrogen chloride by means of oxygen in the presence of a particulate catalyst in a fluidized-bed reactor, where the heat of reaction of the exothermic oxidation of hydrogen chloride is removed by means of water which circulates in the tubes of a shell-and-tube heat exchanger, where (i) the fluidized-bed reactor is heated up to an operating temperature in the range from 350 to 420° C. in a heating-up phase and (ii) hydrogen chloride is reacted with oxygen in an operating phase at the operating temperature, wherein (i-1) the fluidized-bed reactor is heated up to a temperature below the operating temperature in a first heating-up phase and (i-2) hydrogen chloride and oxygen are fed into the fluidized-bed reactor and reacted in a second heating-up phase in which the fluidized-bed reactor is heated up to the operating temperature by the heat of reaction of the exothermic oxidation of hydrogen chloride.

13 Claims, 1 Drawing Sheet

(58) Field of Classification Search
USPC ........................................ 423/500, 502, 507
See application file for complete search history.

(56) References Cited

U.S. PATENT DOCUMENTS

| | | | |
|---|---|---|---|
| 6,197,275 B1 * | 3/2001 | Hagemeyer | B01J 23/18 |
| | | | 423/502 |
| 2002/0028173 A1 * | 3/2002 | Hibi et al. | 423/502 |
| 2007/0183963 A1 | 8/2007 | Seidemann et al. | |
| 2007/0202035 A1 | 8/2007 | Walsdorff et al. | |
| 2008/0269515 A1 * | 10/2008 | Haas | C01B 7/04 |
| | | | 560/341 |
| 2009/0269270 A1 * | 10/2009 | Seidemann | B01J 8/1836 |
| | | | 423/502 |
| 2010/0196255 A1 * | 8/2010 | Horiuchi et al. | 423/502 |

FOREIGN PATENT DOCUMENTS

| | | | |
|---|---|---|---|
| WO | 2005 092488 | 10/2005 | |
| WO | WO 2008034836 A2 * | 3/2008 | B01J 8/1836 |

OTHER PUBLICATIONS

International Search Report dated Sep. 24, 2010 in PCT/EP10/058523 filed on Jun. 17, 2010.

* cited by examiner

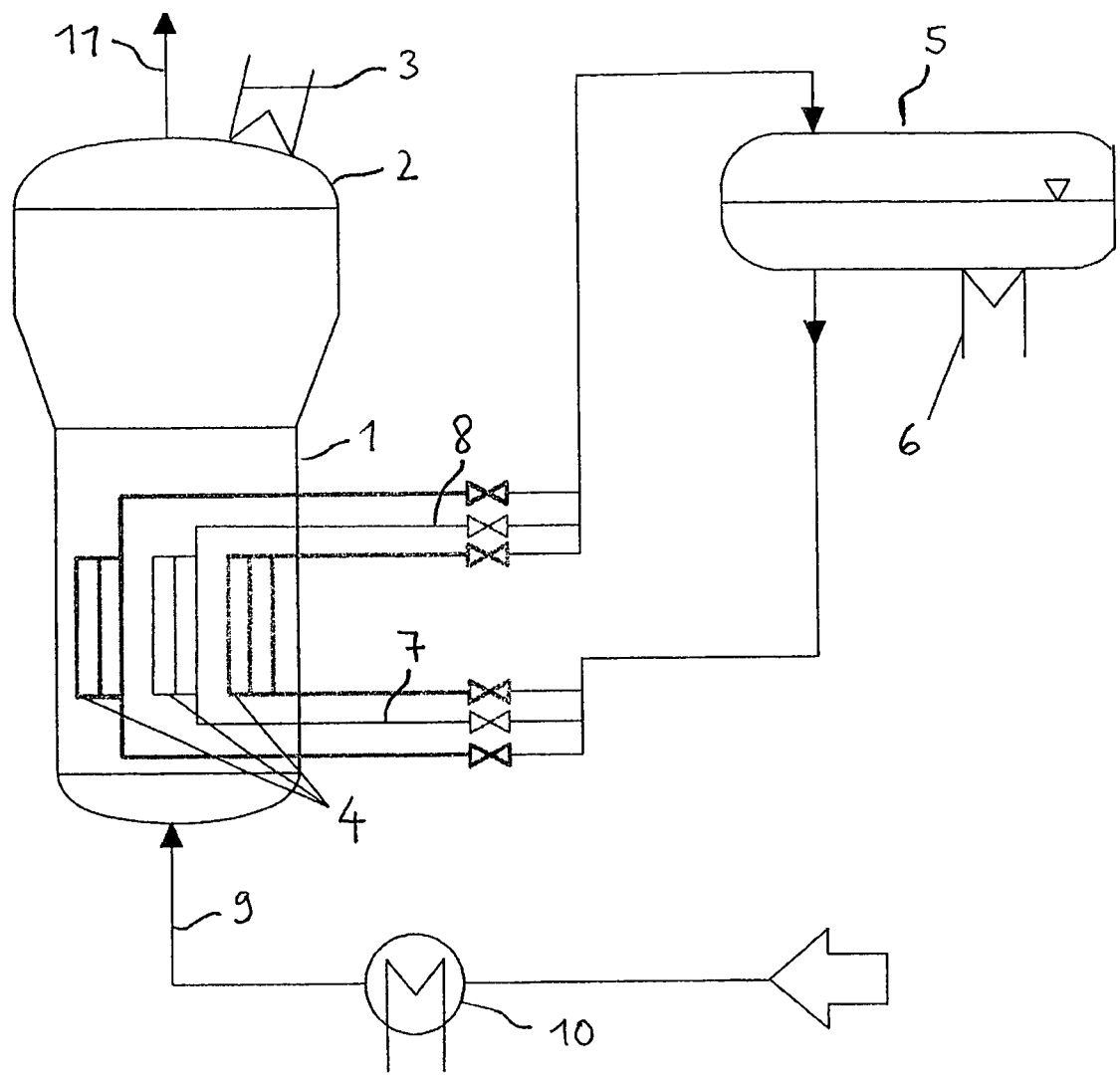

PROCESS FOR PREPARING CHLORINE FROM HCl

CROSS-REFERENCE TO RELATED APPLICATIONS

This application is a National Stage of PCT/EP2010/058523 filed on Jun. 17, 2010. This application is based upon and claims the benefit of priority to European Application No. 09163609.2 filed on Jun. 24, 2009.

The invention relates to a process for preparing chlorine by oxidation of hydrogen chloride in the presence of a heterogeneous particulate catalyst according to the Deacon process in a fluidized-bed reactor.

A fluidized-bed reactor for preparing chlorine by oxidation of hydrogen chloride according to the Deacon process is described, for example, in DE-A 10 2004 014 677: The fluidized-bed reactor comprises a fluidized bed comprising the heterogeneous particulate catalyst which preferably comprises a metal component on an oxidic support, for example ruthenium or copper compounds on aluminum oxide, in particular γ-aluminum oxide or δ-aluminum oxide, zirconium oxide, titanium oxide or mixtures thereof. The reaction gases are fed into the fluidized bed via a gas distributor, with at least one heat exchanger being arranged within the fluidized bed to control the temperature distribution.

The oxidation of hydrogen chloride to chlorine in the presence of a heterogeneous particulate catalyst according to the Deacon process is preferably carried out in the fluidized-bed reactor at temperatures in the range from 350 to 450° C. and pressures in the range from 1 to 11 bar absolute, in particular from 2 to 11 bar absolute.

To remove the heat of reaction from the fluidized bed, it is possible to use, in particular, boiling water since this can take up large quantities of heat at constant temperature. The temperature of the water changes only when all of the water has been vaporized. The boiling point is dependent on the pressure. The higher the pressure of the boiling water, the higher the boiling point. A shell-and-tube heat exchanger is preferably used as heat exchanger.

The heating-up of a fluidized-bed reactor in the start-up phase is usually effected by feeding in a preheated inert gas stream, in general nitrogen. The stream of nitrogen is brought to a high temperature by combustion of natural gas. During heating-up, the heat-exchange tubes are blocked so that no heat transfer medium, usually water, is present therein. Only when the fluidized-bed reactor has reached the desired temperature are the heat-exchange tubes supplied with the heat transfer medium and the feed streams fed into the fluidized-bed reactor and reacted.

In the case of the catalytic oxidation of hydrogen chloride, heating-up of the fluidized-bed reactor is effected by means of nitrogen having a temperature of about 400° C. which is fed into the fluidized-bed reactor. This requires long heating-up times until the desired reactor temperature of 380° C. has been reached. For reasons of reactor approval, the maximum permissible temperature of the nitrogen fed in for heating-up is 450° C. At these temperatures, undesirable sintering of the fluidized-bed catalyst can occur. If the heat exchangers are supplied with water only when the desired reactor temperature of 380° C. has been reached, steam pulses (sudden vaporization of water in the heat-exchange tubes) occur. This can lead to damage to the heat exchangers, in the worst case even to tube rupture.

It is an object of the invention to provide a method of operating a fluidized-bed reactor, in which the fluidized-bed reactor is heated up and brought to operating temperature in a comparatively short time.

The object is achieved by a process for preparing chlorine by oxidation of hydrogen chloride by means of oxygen in the presence of a particulate catalyst in a fluidized-bed reactor, in which the heat of reaction of the exothermic oxidation of hydrogen chloride is removed by means of water which circulates in the tubes of a shell-and-tube heat exchanger, where (i) the fluidized-bed reactor is heated up to an operating temperature in the range from 380 to 420° C. in a heating-up phase and (ii) hydrogen chloride is reacted with oxygen in an operating phase at the operating temperature, wherein (i-1) the fluidized-bed reactor is heated up to a temperature below the operating temperature in a first heating-up phase and (i-2) hydrogen chloride and oxygen are fed into the fluidized-bed reactor and reacted in a second heating-up phase in which the fluidized-bed reactor is heated up to the operating temperature by the heat of reaction of the exothermic oxidation of hydrogen chloride.

During the first heating-up phase, the particulate fluidized-bed catalyst is fluidized by means of an inert gas stream, in general a stream of nitrogen. The fluidized-bed reactor is preferably heated up to a temperature in the range from 250 to 330° C. in the first heating-up phase (i-1).

In the first heating-up phase (i-1), the fluidized-bed reactor can be heated up by introduction of hot nitrogen or by heating the shell-and-tube heat exchanger by means of a heat transfer medium which circulates in the tubes of the heat exchanger. A combination of the two measures is also possible.

In one embodiment of the process of the invention, the fluidized-bed reactor is heated up in the first heating-up phase (i-1) by introduction of hot nitrogen into the reactor. In general, the temperature of the hot nitrogen on introduction into the reactor is from 300 to 500° C., preferably 350 to 450° C., for example 400° C. The gas hourly space velocity (GHSV) is preferably in the range from 39 to 240 $h^{-1}$, in particular in the range from 39 to 160 $h^{-1}$. The GHSV is defined as the volume flow of nitrogen per unit volume of the fluidized bed.

In a further embodiment of the process of the invention, the fluidized-bed reactor is heated up by heating the shell-and-tube heat exchanger in the first heating-up phase (i-1). In general, the shell-and-tube heat exchanger is heated by means of steam which circulates in the tubes of the shell-and-tube heat exchanger. The pressure of the steam is generally from 16 to 165 bar and its temperature is correspondingly from 205 to 350° C.

In one variant, the heat exchanger is heated by means of steam having a pressure of from 16 to 150 bar, for example 50 bar, and a temperature of from 205 to 340° C., for example 265° C. In this case, a temperature in the range from 205 to 340° C., preferably from 250 to 280° C., for example 250° C., is reached in the first heating-up phase (i-1).

In a further variant, the heat exchanger is heated by means of steam having a pressure of from 50 to 165 bar, for example 130 bar, and a temperature of from 265 to 350° C., for example 330° C. In this case, a temperature in the range from 265 to 350° C., for example 320° C., is reached in the first heating-up phase (i-1).

In a further embodiment of the invention, the fluidized-bed reactor is, in the first heating-up phase (i-1), heated up to a temperature of preferably from 250 to 280° C., for example 265° C., by heating the shell-and-tube heat exchanger in a first step and heated up further, preferably to a temperature in the range from 310 to 330° C., for example 320° C., by introduction of hot nitrogen into the reactor in a second step. It is possible to heat up the fluidized-bed reactor to the operating temperature in this way.

After the target temperature in the first heating-up phase (i-1) has been reached, the starting materials for the oxidation of hydrogen chloride are fed into the reactor and reacted in the presence of the fluidized-bed catalyst in a second heating-up phase (i-2). The molar ratio of hydrogen chloride:$O_2$ is usually in the range from 1:1 to 5:1. The feed gas mixture can comprise up to 20% by volume of nitrogen. It generally comprises from 1 to 15% by volume, preferably from 2 to 7% by volume, of nitrogen. The pressure during the heating-up procedure is preferably from 2 to 11 bar, in particular from 3 to 6 bar. The WHSV over the catalyst is preferably in the range from 0.05 to 1 kg of HCl/(kg of cat.·h), in particular in the range from 0.1 to 0.5 kg of HCl/(kg of cat.·h). The gas hourly space velocity (GHSV) is generally in the range from 39 to 480 $h^{-1}$. The fluidized-bed reactor is heated up to the operating temperature by the heat of reaction liberated in the exothermic oxidation of hydrogen chloride.

During the second heating-up phase, water circulates in the tubes of the shell-and-tube heat exchanger. This counters the risk of steam pulses.

After the operating temperature has been reached, the catalytic oxidation of hydrogen chloride is continued. Here, the molar ratio of hydrogen chloride:$O_2$ is generally in the range from 1:1 to 5:1. The feed gas mixture generally comprises from 1 to 15% by volume of nitrogen. The pressure is from 1 to 11 bar absolute, preferably from 2 to 11 bar absolute. The WHSV over the catalyst is generally in the range from 0.05 to 1 kg of HCl/(kg of cat.·h) and the gas hourly space velocity (GHSV) is generally from 39 to 480 $h^{-1}$.

In an embodiment of the process of the invention, the fluidized-bed reactor is heated up to a temperature of about 350° C. and hydrogen chloride is reacted with oxygen at an initial molar ratio of 1:2 in the operating phase, so that an HCl conversion of about 70% is achieved. To counter a decrease in the HCl conversion due to progressive deactivation of the catalyst, the temperature is gradually increased to 420° C. The initial operating temperature during the operating phase can also be below this and be, for example, only 330° C., with the conversion also being able to be below 70%, for example 68%. To maintain this conversion, the operating temperature is, for example, increased to about 400° C. over a period of 325 days.

In a preferred embodiment, the fluidized-bed reactor is heated up to 380° C. and the operating phase is commenced with an initial molar ratio of HCl:$O_2$ of 4:1. A conversion of about 70% is achieved here. To counter a decrease in the conversion due to progressive deactivation of the catalyst, the HCl:$O_2$ ratio is reduced down to 2:1. If the conversion of about 70% can no longer be maintained even at an HCl:$O_2$ ratio of 2:1, the temperature can additionally be increased, for example up to 420° C. Thus, for example, a conversion of about 68% is maintained when the reaction is carried out at an operating temperature of 380° C. and the HCl:$O_2$ ratio is decreased from 4:1 to 3:1 over a period of 120 days. It has been found that despite the higher temperature, the catalyst is not deactivated more rapidly. A further advantage is that the fluidized-bed reactor is operated at a higher average temperature, namely 380° C. Here, steam having a higher pressure and a higher temperature is produced in the heat exchangers.

In a further variant, the fluidized-bed reactor is heated up to an operating temperature in the range from 350° C. to 380° C., with the HCl:$O_2$ ratio at the beginning of the operating phase being in the range from 4:1 to 2:1. To counter a decrease in the conversion initially achieved, it is possible to increase the operating temperature gradually or to decrease the HCl:$O_2$ ratio gradually or to undertake both measures.

According to the invention, further measures for heating the reactor can be provided. Thus, the reactor head can be additionally heated by means of steam using installed heating coils or by means of electric heating. The additional heating enables the reactor head to be heated up simultaneously with the fluidized bed in the lower part of the reactor.

The single FIGURE schematically shows an embodiment of a plant for carrying out the process of the invention, comprising a fluidized-bed reactor 1 comprising a reactor head 2 with additional heating 3, a steam circuit comprising a shell-and-tube heat exchanger 4 (here in a three-part configuration) arranged in the fluidized-bed reactor, a steam drum 5 for producing steam having a heating device 6 which can be configured as combustion heating or electric heating, feed lines 7 and return lines 8 between steam drum and shell-and-tube heat exchanger, a feed line 9 for the feed gases or for the hot nitrogen, a heat exchanger 10 for heating the feed gases or the nitrogen and also a discharge line 11.

The invention is illustrated by the following examples.

EXAMPLES

Comparative Example

The heating-up of a fluidized-bed reactor from an initial temperature of 0° C. to the operating temperature of 380° C. was simulated mathematically. Heating by means of nitrogen having a temperature of 400° C., which is introduced via the gas distributor plate, was assumed. The heat exchanger of the fluidized-bed reactor is not in operation and not filled with heat transfer medium or cooling medium.

The calculation is additionally based on the following assumptions:
 mass of the catalyst particles: 70 t
 specific heat capacity of the catalyst particles: 0.9 kJ/kg/K
 particle density: 2400 kg/$m^3$
 mass of the reactor: 140 t
 specific heat capacity of the reactor: 0.44 kJ/kg/K
 mass flow of nitrogen: 15 t/h
 initial temperature: 0° C.
 target temperature: 380° C.
 Result: About 23.5 h are required for heating up the reactor including the catalyst.

Example

The heating-up of the fluidized-bed reactor was simulated mathematically. The calculation was based on a three-stage heating-up procedure. Here,
 i) in a first stage, the reactor is heated up from 0° C. to about 250° C. by heating the heat exchanger with steam having a temperature of 265° C.,
 ii) heating is subsequently continued to about 320° C. by means of nitrogen having a temperature of 400° C., with heat transfer medium no longer circulating in the tubes of the heat exchanger after a temperature of 265° C. has been reached, and iii) after a temperature of 320° C. has been reached, hydrogen chloride and oxygen are fed into the fluidized-bed reactor and reacted and the heat of reaction liberated is used for further heating-up to 380° C.

The calculation was based on the following further assumptions:

mass of the catalyst particles: 70 t
specific heat capacity of the catalyst particles: 0.9 kJ/kg/K
particle density: 2400 kg/m$^3$
mass of the reactor: 140 t
specific heat capacity of the reactor: 0.44 kJ/kg/K
heat transfer area: 62 m$^2$
heat transfer coefficient steam—tube: 20 W/m$^2$/K
heat transfer coefficient tube—fluidized bed: 750 W/m$^2$/K
resulting k value: 19.5 W/m$^2$/K
steam temperature: 265° C.
amount of steam: 100 t/h
specific heat capacity of the steam: 4.5 kJ/kg/K
amount of hydrogen chloride: 8.8 t/h
ratio of HCl:O$_2$: 4
catalyst activity: 1
reactor pressure: 5 bar absolute Result: The heating-up i) to 250° C. by means of steam having a temperature of 265° C. takes about 4 hours, the further heating-up ii) to 320° C. by means of nitrogen having a temperature of 400° C. takes a further 5 hours and the further heating-up iii) to 380° C. utilizing the heat of reaction takes about 1 hour. The entire heating-up procedure takes a total of about 10.3 hours.

The invention claimed is:

1. A process for preparing chlorine, the process comprising:
    introducing hot nitrogen into a fluidized-bed reactor to heat the fluidized-bed reactor to a first temperature in a first heating phase;
    feeding hydrogen chloride and oxygen into the fluidized-bed reactor and reacting the hydrogen chloride and oxygen, thereby heating the fluidized-bed reactor to an operating temperature of from 350 to 420° C. in a second heating phase;
    further reacting hydrogen chloride with oxygen in the presence of a particulate catalyst in the fluidized-bed reactor at the operating temperature in an operating phase; and
    circulating water in a tube of a shell-and-tube heat exchanger to remove heat from the fluidized-bed reactor,
  wherein:
    the first temperature is below the operating temperature;
    the operating temperature is increased during the operating phase to counter a decrease in HCl conversion due to progressive deactivation of the particulate catalyst;
    the first heating phase occurs before the hydrochloric acid and oxygen are introduced into the fluidized-bed reactor; and
    the first heating phase further comprises circulating a heat transfer medium in the tube of the shell-and-tube heat exchanger to heat the shell-and-tube heat exchanger, thereby heating the fluidized-bed reactor;
    wherein the HCl:O$_2$ ratio is reduced during the operating phase to counter a decrease in HCl conversion due to progressive deactivation of the particulate catalyst.

2. The process of claim 1, wherein the first temperature is from 205 to 350° C.

3. The process of claim 1, wherein a temperature of the hot nitrogen is from 300 to 400° C. when the hot nitrogen is introduced into the fluidized-bed reactor.

4. The process of claim 1, wherein the heat transfer medium is steam having a pressure of from 16 to 165 bar and a temperature of from 205 to 350° C.

5. The process of claim 1, wherein the introducing of the hot nitrogen into the fluidized-bed reactor occurs after the circulating of the heat transfer medium.

6. The process of claim 1, wherein the fluidized-bed reactor comprises a heterogeneous particulate catalyst, comprising a metal component on an oxidic support.

7. The process of claim 6, wherein the particulate catalyst comprises, as the metal component, a ruthenium compound, a copper compound, or mixtures thereof.

8. The process of claim 6, wherein the particulate catalyst comprises, as the oxidic support, aluminum oxide, zirconium oxide, titanium oxide, or mixtures thereof.

9. The process of claim 1, wherein a pressure in the fluidized-bed reactor is from 1 to 11 bar absolute when oxidizing hydrogen chloride.

10. The process of claim 1, wherein a molar ratio of hydrogen chloride to O$_2$ in the second heating phase is from 1:1 to 5:1.

11. The process of claim 1, wherein a feed gas mixture for feeding hydrogen chloride, oxygen, or both hydrogen chloride and oxygen into the fluidized-bed reactor in the second heating phase comprises nitrogen in a content of 20% or less by volume.

12. The process of claim 1, wherein a pressure in the fluidized-bed reactor is from 2 to 11 bar during the second heating phase.

13. The process of claim 1, wherein the fluidized-bed reactor comprises a particulate catalyst.

* * * * *